(12) United States Patent
Keller, Jr. et al.

(10) Patent No.: US 9,587,420 B2
(45) Date of Patent: Mar. 7, 2017

(54) WIRELESS OBSTACLE DETECTION FOR USE WITH DIFFERENT BARRIER OPERATOR TYPES

(71) Applicant: The Chamberlain Group, Inc., Elmhurst, IL (US)

(72) Inventors: Robert Roy Keller, Jr., Park Ridge, IL (US); Cory Jon Sorice, LaGrange, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 14/789,576

(22) Filed: Jul. 1, 2015

(65) Prior Publication Data
US 2017/0002595 A1    Jan. 5, 2017

(51) Int. Cl.
*E05F 15/40* (2015.01)
*G07C 9/00* (2006.01)
*H04L 29/06* (2006.01)

(52) U.S. Cl.
CPC .......... *E05F 15/40* (2015.01); *G07C 9/00126* (2013.01); *H04L 69/18* (2013.01); *E05Y 2900/106* (2013.01)

(58) Field of Classification Search
CPC ..... E05F 15/40; H04L 69/18; G07C 9/00126; E05Y 2900/106
(Continued)

(56) References Cited

U.S. PATENT DOCUMENTS 5,493,812 A   2/1996 Teich
5,584,145 A   12/1996 Teich
(Continued)

FOREIGN PATENT DOCUMENTS

AU    2008202369 A1    1/2009
EP       2148447 A1 *  1/2010   ............. G01S 19/28

OTHER PUBLICATIONS

Wayne alton Wireless Infrared Safety Beam Sensors; Catalog pages; http://www.waynedaltonparts.com/Wayne-Dalton-Wireless-Infrared-Safe . . . ; Known of as early as Dec. 11, 2014.
(Continued)

*Primary Examiner* — Jerry Redman
(74) *Attorney, Agent, or Firm* — Fitch Even Tabin & Flannery LLP

(57) ABSTRACT

A wireless obstacle detection system includes a wireless photosensitive sensor and a communication module designed to provide a retrofit solution for easily adding obstacle detection capabilities to a previously installed barrier operator system. In one form, the wireless obstacle detector can be provided with a gateway device for adding additional functionality, including enabling long range remote operation of a barrier operator. To facilitate ease of installation, the communication module can communicate with a large variety of barrier operators including using at least two different protocols for communication with obstacle detectors. Such communication may be wireless or wired, depending on the barrier operator and communication protocol implemented by a particular previously installed barrier operator. The communication module may be designed to configure itself to operate with the communication protocol of the previously installed barrier operator. Once configured to be able to communicate with the previously installed barrier operator, the communication module receives communications from the wireless obstacle detector about the presence or absence of an obstacle at or near the barrier and transmits a corresponding communication to the barrier operator using the correct protocol.

16 Claims, 6 Drawing Sheets

(58) Field of Classification Search
USPC .................................................. 49/197, 199
See application file for complete search history.

(56) References Cited

U.S. PATENT DOCUMENTS

| | | | |
|---|---|---|---|
| 5,596,840 A | 1/1997 | Teich | |
| 5,625,980 A | 5/1997 | Teich | |
| 7,869,718 B1 | 1/2011 | Sao | |
| 7,956,718 B2 | 6/2011 | Murphy | |
| 9,122,254 B2 * | 9/2015 | Cate .......................... | E05F 15/60 |
| 2007/0164854 A1 * | 7/2007 | Hill ........................... | B60Q 9/00 |
| | | | 340/457 |
| 2011/0202277 A1 * | 8/2011 | Haddad .................. | G01S 13/885 |
| | | | 702/7 |
| 2012/0092125 A1 | 4/2012 | Farber | |
| 2012/0299697 A1 | 11/2012 | Siegesmund | |
| 2014/0125499 A1 | 5/2014 | Cate | |

OTHER PUBLICATIONS

International Search Report and the Written Opinion of the International Searching Authority; PCT Patent Application No. PCT/US2016/040049; Dated Aug. 25, 2016.

* cited by examiner

WIRELESS OBSTACLE DETECTION FOR USE WITH DIFFERENT BARRIER OPERATOR TYPES

TECHNICAL FIELD

This invention relates generally to wireless obstacle detectors for use with movable barrier operators. More particularly, it relates to apparatuses, systems, and methods for integrating a wireless obstacle detector with preexisting movable barrier operators for enhancing the operation of said operators.

BACKGROUND

Barrier operators of various kinds have been known and used for many years. Examples of such barrier operators include gate operators, rolling shutter operators, garage door operators, and the like. In one example, garage door operators are mounted within a garage to automate the process of opening and closing a garage door. In its simplest form, a garage door operator includes a motor connected to move a barrier between an open position and a closed position and control circuitry configured to control the motor. Such garage door operators can reliably operate a garage door for many years with basic maintenance.

More recently, however, barrier operators have begun evolving to include additional features beyond the simple task of opening and closing the barrier. Such new features include network communication options including remote operation of the barrier operator, such as by a smartphone or other network connected device, and the like. To have access to such features, however, typically a completely new barrier operator with a new motor and connection equipment must be purchased and installed for a user to have access to the new features. This contradicts the reality where barrier operators are generally designed to perform their core function of opening and closing a barrier for many years.

Secondary safety or entrapment devices such as safety eyes (IR, photo-eye, and the like) or door edges for movable barrier operators (MBOs), such as garage door openers (GDOs), are a requirement for an Underwriters Laboratories (UL) listing throughout the United States. While they have greatly increased the safety of MBOs since their introduction in the 1990s, they are time consuming to install in their traditional configuration with wires running from each safety eye to the MBO itself. Some older MBOs may not have safety eyes, or in the case of users outside of the United States, safety eyes may not be required and therefore may not be present even on newer MBOs.

However, if a user desires to operate an MBO remotely, such as via a network connected computing device, (e.g. a smartphone), a secondary safety device would generally be required, as the user is not present at the barrier to confirm that it is safe to move the barrier. If the MBO does not already have a secondary safety device, one must be installed in order to comply with safety requirements or in the situation that the remote operator requires an input from a secondary safety device before it will execute remote commands to move the barrier. Unfortunately, known secondary safety devices, such as photo eyes, are generally configured to be wired directly to the MBO or are designed to be used with only a single brand or model of MBO, and therefore are not designed to be used in a retrofit scenario to integrate with a variety of different brands and models of MBOs. In addition, some MBOs may not be configured to operate with a secondary safety device at all.

SUMMARY

In one embodiment, a wireless obstacle detector, such as a pair of photoelectric sensors, i.e., safety eyes, are configured with wireless communications abilities (such as, for example, BLUETOOTH, BLUETOOTH SMART (Low Energy), or WiFi using separate receiver/transmitters or a combined transceiver that includes both a receiver and transmitter in one structure) for communication directly to and/or bi-directionally with a communication module. The communication module receives communications from the wireless obstacle detector and then adapts the communication for transmission to the MBO using the appropriate protocol, which may vary from the protocol used by the obstacle detector, because different manufacturers or models of MBOs may use different obstacle detector communication protocols. Accordingly, the communication module is designed to communicate with a large variety of MBO systems. Such communication may be wireless or wired, depending on the communication protocol implemented by a particular previously installed barrier operator. To facilitate the ease of installation of the wireless obstacle detector and communication module, the communication module is designed to determine what obstacle detector communication protocol to use to properly communicate with the MBO. In some forms, the communication module is configured to accept a user input to determine the proper communication protocol, such as a manual selection of the protocol used, or a communication containing information regarding the manufacturer, model, or type of the barrier operator. In other forms, the communication module may send a barrier operator communication using a plurality of different obstacle detector communication protocols in sequence and receive feedback information from the barrier operator, another device, or a user to indicate that the previously installed barrier operator performed an action in response to receipt of the communication from the communication module. Based on that feedback, the communication module is configured to operate with the communication protocol that elicited the response from the previously installed barrier operator.

The communication module accordingly will receive communications from the obstacle detector regarding the presence or absence of an obstacle, and if necessary, translate or adapt this communication into the correct protocol understandable by a separate MBO, and then transmit a corresponding barrier operator communication using the determined protocol to the MBO. Such a system allows a user to easily and quickly install the obstacle detector and allows the obstacle detector to function with virtually any existing MBO without requiring modification to the MBO. In addition, such a system can provide a wireless communication path between the obstacle detector and MBO that eliminates the traditional wires and the aesthetic problem of having wires running from the obstacle detector at the barrier to the MBO. This approach can also save time for the installer, especially for homeowners who may only install one or two MBOs in his or her life. For professional installers, the time savings could allow them to install 1-2 more MBOs in a day. A further advantage of such a system is that because the obstacle detector system is compatible with all or most MBOs, installers and sellers need not stock a large variety of obstacle detector types.

The communication module may also be configured for communication with peripheral devices, such as computing devices, e.g., a smartphone having BLUETOOTH, BLUETOOTH SMART, or WiFi capability, or a network-connected gateway or computing device. The communication module may communicate with peripherals for various purposes, such as providing a status of the obstacle detector to the peripheral device, establishing a communication link between the obstacle detector and the communication module, or determining the communication protocol used by the MBO.

In one embodiment, the communication module takes the form of a wireless receiver adapter that may be connected to the MBO via a wireline connection to the terminal ports provided on the MBO for communication with safety eyes. Alternatively a wireless connection could be used. The wireless receiver adapter is configured to receive communications from the obstacle detector, determine the correct communication protocol, such as the modulation technique understood by the MBO for obstacle detection, and then using the correct protocol, transmit a corresponding communication to the MBO via the wireline connection. In this form, the obstacle detector may be used with any preexisting MBO which is configured to receive an obstacle detection input.

Alternatively, for example, if the MBO is not configured to receive an input from an obstacle detector, the communication module may take the form of a network-connected gateway device, such as the device disclosed in U.S. Published Patent Application No. 2014/0125499, the disclosure of which is incorporated herein by reference in its entirety. Such a device is configured to control the operation of the MBO by transmitting commands received from a remote source, such as a command to close the barrier entered by a user from a remote location by computer or smartphone. Such a gateway device may be configured to communicate with the wireless obstacle detector and modify the operation of the gateway device based on the input from the obstacle detector. For example, if the gateway device receives a command from a remote user to close the barrier and the obstacle detector detects an obstruction, the gateway device will not transmit the command to close the barrier to the MBO. In this form, obstacle detection features may be added to MBOs that are not designed for obstacle detection. Such an embodiment also advantageously permits safe remote operation of such MBOs.

In yet another form, the wireless obstacle detector may be used with both a wireless receiver adapter and a gateway device. In such a form, the wireless receiver adapter will communicate with the MBO as described above and thereby take advantage of the MBO's internal safety functions relating to obstacle detection. The gateway device may also communicate with the wireless receiver adapter to set up and configure the obstacle detector or obtain information about the status of the obstacle detector, for example to relay information via a network-connected computing device to a remote user about the presence of an obstacle or to notify a user about a low battery of the obstacle detector. These and other benefits may become clearer upon making a thorough review and study of the following detailed description.

BRIEF DESCRIPTION OF THE DRAWINGS

The above needs are at least partially met through provision of the wireless obstacle detection system described in the following detailed description, particularly, when studied in conjunction with the drawings wherein.

Skilled artisans will appreciate the elements and the figures are illustrated for simplicity and clarity and have not necessarily been drawn to scale. For example, the dimensions and/or relative positioning of some of the elements in the figures may be exaggerated relative to other elements to help improve understanding of various embodiments. Also, common but well understood elements that are useful or necessary in a commercially feasible embodiment are often not depicted to facilitate a less obstructive view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions and a person skilled in the technical field as set forth above, except where different specific meanings have otherwise been set forth herein.

DETAILED DESCRIPTION

Figure 1:
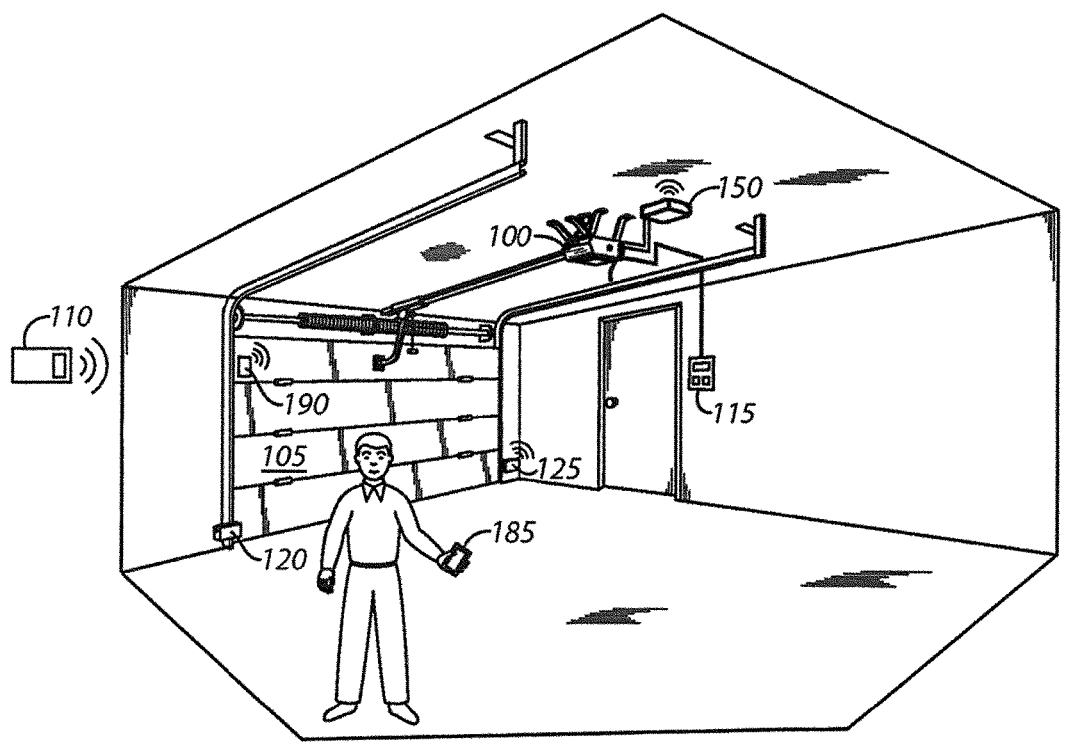
FIG. 1 comprises a perspective view of an example environment in which a wireless obstacle detector and wireless receiver adapter may be applied as configured in accordance with various embodiments of the invention.

Referring now to the drawings and, in particular, to FIG. 1, an example environment in which a wireless obstacle detection system may operate will now be presented. A previously installed barrier operator 100 is configured to move a barrier 105 between open and closed positions. In the illustrated example, the barrier operator 100 is a garage door opener configured to open and close a garage door for a typical garage although the subject matter described herein can be applied to a variety of other barrier operator settings, including commercial door operators and gate operators. The barrier operator 100 can be activated to open or close the barrier 105 using a remote control device 110 or a wired wall control 115. The remote control device 110 communicates directly with the barrier operator 100 using a radio frequency based, wireless communication that is received and analyzed by the barrier operator 100 to determine what action it should take in response to receipt of the signal from the remote control device 110. Similarly, the wall control device 115 includes buttons that when pressed effect sending a signal over the wire to the barrier operator 100 to effect the opening or closing of the barrier 105 or performance of another action.

A wireless obstacle detector, such as an optical-based obstacle detector in the form of wireless photo eye transmitter and receiver modules 120, 125 are installed on either side of the barrier 105 for detecting an obstacle in or near the path of the barrier 105. As shown in FIG. 2A, the photo eye transmitter module 120 includes a photoelectric transmitter 130 for transmitting an infrared (IR) light beam directed at the receiver module 125. The receiver module 125 includes a photoelectric receiver 135 operably connected to an input/output module 140 including a wireless transmitter configured to communicate wirelessly with at least a communication module separate from the barrier operator 100. Alternatively, the input/output module 140 of photo eyes 120, 125 may communicate directly with a barrier operator 100 if the operator is configured to receive wireless obstacle detection communications. In one form, the input/output module 140 is configured to communicate via a BLUETOOTH SMART wireless protocol. Of course, other wireless protocols for communicating data wirelessly may be used. The input/output module may be operably connected to an antenna 145 for transmitting and receiving signals. The photo eyes 120, 125 are powered by batteries (not shown), but alternatively could be configured for receiving power from a wall outlet or other source.

Figure 2B:
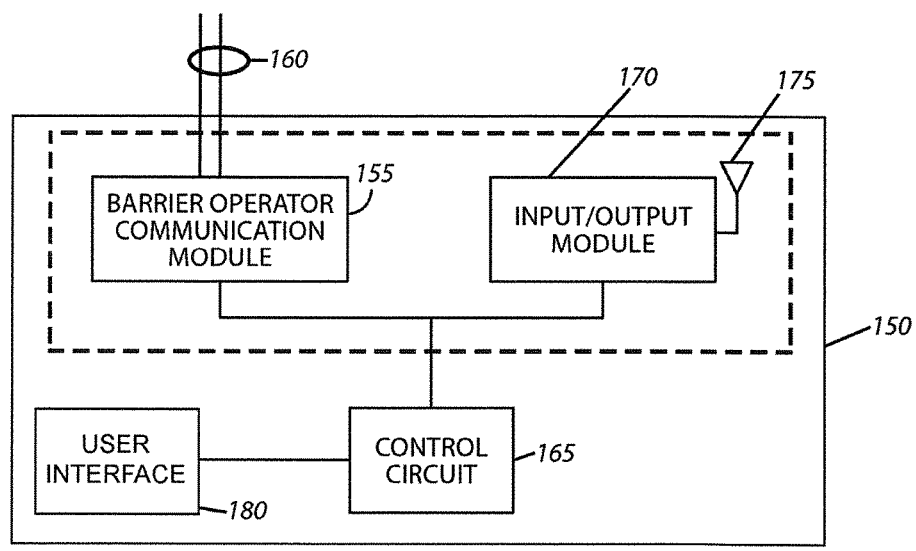
FIG. 2B comprises a block diagram of an example wireless receiver adapter as configured in accordance with various embodiments of the invention.
Figure 2A:
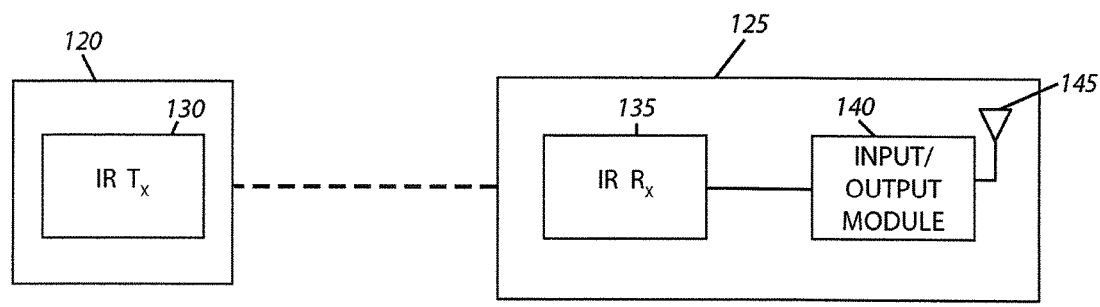
FIG. 2A comprises a block diagram of an example obstacle detector in the form of wireless photo eye sensors configured in accordance with various embodiments of the invention.

As shown in FIGS. 1 and 2B, the communication module may take the form of a wireless receiver adapter 150. This wireless receiver adapter 150 includes an input/output module 170 with a wireless receiver that is configured to receive wireless communications from the wireless transmitter of the input/output module 140 of the wireless photo eye receiver module 125, and then communicate with a plurality of barrier operator types by sending a barrier operator communication through a barrier operator communication module 155 by wired communication protocols, although wireless protocols may alternatively be used. The barrier operator communication module 155 includes a wired communication port 160 configured to be connected through one or more wires to the obstacle detector input terminals of a barrier operator 100. The wireless receiver adapter 150 may receive power through the obstacle detector input terminals of the barrier operator 100, or alternatively may be powered by a separate port on the barrier operator 100, or may be powered by a battery, or combinations thereof. The wireless receiver adapter 150 also includes a processing device or control circuitry 165 configured to use the barrier operator communication module 155 to communicate with any of the plurality of barrier operator types, which may have one of at least two different protocols for receiving obstacle detector information, such as information regarding the presence or absence of an obstacle or the status of the obstacle detector. So configured, the wireless receiver adapter 150 readily facilitates installation and coordination with a variety of previously installed barrier operator types. For example, the wireless receiver adapter 150 is configured to communicate with all or a subset of all barrier operators currently installed. Thus, a user who purchases a wireless obstacle detection system can be reasonably assured that it will be compatible with the user's particular previously installed barrier operator.

Most barrier operators are configured to receive and understand particular modulated signals transmitted from wired photo eyes that are designed to be paired with a particular manufacturer or model of MBO. In general, photo eyes will transmit different modulated signals corresponding with different conditions sensed by the photo eyes, such as a normal "all clear" signal wherein the photo eyes are operating properly and detect no obstacle, and an "obstructed" signal (or lack thereof) corresponding to when an obstacle is detected or when the photo eyes are improperly aligned, or other fault or malfunction. For example, the wireless photo eyes 120, 125 may send a constant pulsed signal to communicate an "all clear" condition to the movable barrier operator 100. For example, this signal may have a pulse width, i.e., the length of time the signal is pulled low, between 150 to 700 microseconds. However, the pulse width in other forms may have any value less than the pulse rate, i.e., the time duration between pulses. In some forms, the pulse rate may range between 1 to 15 milliseconds. In one currently preferred form, the pulse rate may range between 2.5 and 4.0 ms.

MBOs may be configured to sense an obstruction when they detect an absence of negative pulses, i.e., the transition of the signal from a high voltage to a low voltage, within a predetermined time limit. For example, when the photo eyes 120, 125 detect an obstacle, or alternatively if the photo eyes are improperly aligned, the signal will shift from the "all clear" signal to the "obstructed" signal, wherein the signal is pulled low for a longer period of time than the normal "all clear" pulse width. Negative pulses may be stopped for a period of time corresponding with the duration of the obstruction or a predetermined time. According to one form, the signal may be pulled low from between 1 and 500 ms, and more particularly between 25 and 125 ms, to indicate that the IR beam has been broken. In other forms, the upper extent of the range may be between 4 and 15 ms. When the obstruction is removed, the signal will return to its regular "all clear" timing.

The wireless photo eyes 120, 125 may also send additional modulated signals, such as a periodic status signal corresponding with normal operation, a low battery, or a malfunction of the photo eyes 120, 125. For example, a status signal could be sent from the input/output module 140 of the photo eye receiver module 125 to the communication module every 24 seconds to ensure that the photo eyes 120, 125 are present and operating normally. In addition to saving battery life, the photo eyes 120, 125 may include a sleep mode, wherein the photo eyes turn off until they receive a signal to wake up and return to normal operation. For example, the photo eyes 120, 125 may be configured to activate whenever the movable barrier operator 100 is activated to open or close the barrier 105.

Because different barrier operators use photo eyes that transmit signals using different modulation techniques, the wireless receiver adapter 150 is advantageously configured to determine the proper modulation technique used by the barrier operator to communicate with photo eyes. The wireless receiver adapter 150 may use a variety of methods for determining the correct communication protocol to communicate with a variety of different barrier operator types. In one form, the wireless receiver adapter 150 includes a user input module or interface 180 for receiving user input to select the correct communication protocol. For example, the control circuitry 165 configures the barrier operator communications module 155 to operate according to a communication protocol in response to receipt of an instruction signal through the user interface 180. In one such approach, a list of barrier operator types can be provided to a user through the user interface 180 or through separate documentation that will allow the user to use the user interface 180 to input the barrier operator type to the receiver adapter 150. In response to receipt of this feedback from the user interface 180, the control circuitry 165 can access a local or non-local memory or other storage such as an online database that will associate a communication protocol with the barrier operator type information received through the user interface 180. The control circuitry 165 will then configure the barrier operator communication module 155 to operate in accordance with that communication protocol.

In a further aspect, a similar user interface can be provided on another device remote from the receiver adapter 150. For instance, a mobile device or other computer can be programmed, run an application, or receive signals from another device to effect display of a user interface that allows a user to interact with the receiver adapter 150 either over a network or via direct wireless communication using known techniques. For example, a smartphone 185 may be configured with an application for allowing a user to select the particular manufacturer and model of the barrier operator 100. Once the correct barrier operator type is selected, the application may communicate with the receiver adapter 150 via the input/output module 170 to select the modulation technique used by the selected barrier operator 100. The control circuit 165 thereby determines the correct communication protocol and is then configured to transmit a signal corresponding to the signal received from the photo eyes 120, 125 to the barrier operator 100.

Alternatively, the user interface 180 may include one or more buttons or switches for selecting one of a plurality of different modulation techniques associated with particular manufacturers or models of barrier operators. By manipulating the switches appropriately, the control circuit 165 and/or the barrier operator communication module 155 may convert the received signal from the photo eye receiver module 125 into a corresponding signal that is understood by the barrier operator 100. For example, the user may be provided with a list of MBO models and a corresponding list of switch positions (or numbers corresponding to the switch positions) for selecting the appropriate modulation technique used by a particular MBO. Some MBOs are provided with color-coded "learn" buttons for programming remote controls for the MBO. The color of the learn button may also be used to determine which user interface switch position to use for selecting the appropriate modulation technique.

In another form, the wireless receiver adapter 150 may be configured with a learning mode for determining the correct communication protocol used by the barrier operator 100 for receiving communications from an obstacle detector. In one approach, "close" commands for closing the barrier 105 are sent to the barrier operator 100 while the wireless receiver adapter 150 sends one of a plurality of different barrier communication signals corresponding to an "all-clear" condition of the obstacle detector, which is required by the barrier operator 100 to close the barrier 105. The "close" commands could be sent automatically by a wall control 115 or a gateway device 195, or could be manually transmitted by a user via a wireless remote 110 or other device and be coordinated by a flashing light on the wireless receiver adapter 150. A "close" command is sent to the barrier operator 100 and an "all-clear" barrier communication signal using one of the plurality of different communication protocols are simultaneously sent to the barrier operator. The wireless receiver adapter 150 will step through different communication protocols until the correct "all-clear" barrier communication signal is found, which is determined when the barrier operator 100 begins closing the barrier 105. The wireless receiver adapter 150 may be configured to remember the communication protocol which effected the closing of the barrier 100 when it receives an indication that the correct communication protocol was used, such as an input of a user at the user interface 180, or a communication received from an external device.

In one form, the control circuitry 165 is configured to effect sending a barrier operator communication from the barrier operator communication module 155 via a plurality of communication protocols to the pre-installed barrier operator 100. For example, the barrier operator communication module 155 can be configured to be able to communicate with a plurality of barrier operator types by sending barrier operator communications by one or more known modulation techniques used by various obstacle detectors and their corresponding barrier operators.

By one approach, the control circuitry 165 can wait for a time after sending a barrier operator communication to the pre-installed barrier operator 100 to receive a communication indicating a response from a user, the pre-installed barrier operator 100, or another device before sending another communication signal using a different protocol. The communication indicating the response from the pre-installed barrier operator can be received in a number of ways. For example, the receipt may occur through an input/output module 170. Examples of signals include ones from a door sensor 190 or limit sensor indicating a change in door movement, meaning that an obstacle (or lack thereof) was detected and that the communication protocol used was effective to communicate the presence (or absence) of an obstacle to the barrier operator 100. In response to receiving the communication indicating the response from the pre-installed barrier operator, the control circuitry 165 configures the barrier operator communication module 155 to operate according to the communication protocol that effected the response from the pre-installed barrier operator 100. By this example approach, the wireless receiver adapter 150 can configure itself or learn the communication protocol with which it can communicate with the pre-installed barrier operator 100 with minimal intervention or effort on behalf of the device's user. Once the communication protocol for the previously installed barrier operator 100 is determined, the control circuitry 165 is configured to use the barrier operator communication module 155 to communicate the presence or absence of an obstacle to at least one pre-installed barrier operator 100.

In addition to communicating with the photo eyes 120, 125, the input/output module 170 may also be configured to receive communications from at least one peripheral device configured to provide at least one of information regarding an operational status of the photo eyes 120, 125 or the receiver adapter 150, to establish a communication link between the photo eyes 120, 125 and the wireless receiver adapter 150, or determine the communication protocol used by the barrier operator 100. These communications can be performed by a number of different physical layer structures. In one example, the communication can be carried via a wired or bus connection or via a wireless radio communication. The wireless communication can follow any protocol including single frequency, spread spectrum, Wi-Fi, BLUETOOTH, and the like. Generally speaking, the input/output module 170 is designed to provide for communications with any of a variety of devices other than the photo eyes 120, 125. So configured, the input/output module 170 can facilitate many types of interactions with other devices.

Those skilled in the art will recognize and understand that the input/output module 170 and barrier operator communication module 155 may be comprised of a plurality of physically distinct elements as is suggested by the illustration shown in FIG. 2. It is also possible, however, to view this illustration as comprising a logical view, in which case one or more of these elements can be enabled and realized via a shared platform such that the operations described as being separate at the barrier operator communication module 155 and the input/output module 170 are performed by the same physical elements. It will also be understood that such a shared platform may comprise a wholly or at least partially programmable platform as are known in the art. Moreover, the interfaces for the receiver adapter 150 for the peripheral devices may include different physical implementations to effect such communication, such as with a wired or wireless wall controller, with a wireless or radio communication device, or with another device. Such communication hardware configured to communicate with the individual peripheral devices are generally known and applicable by those of skill in the art and need no further discussion herein.

Figure 3:
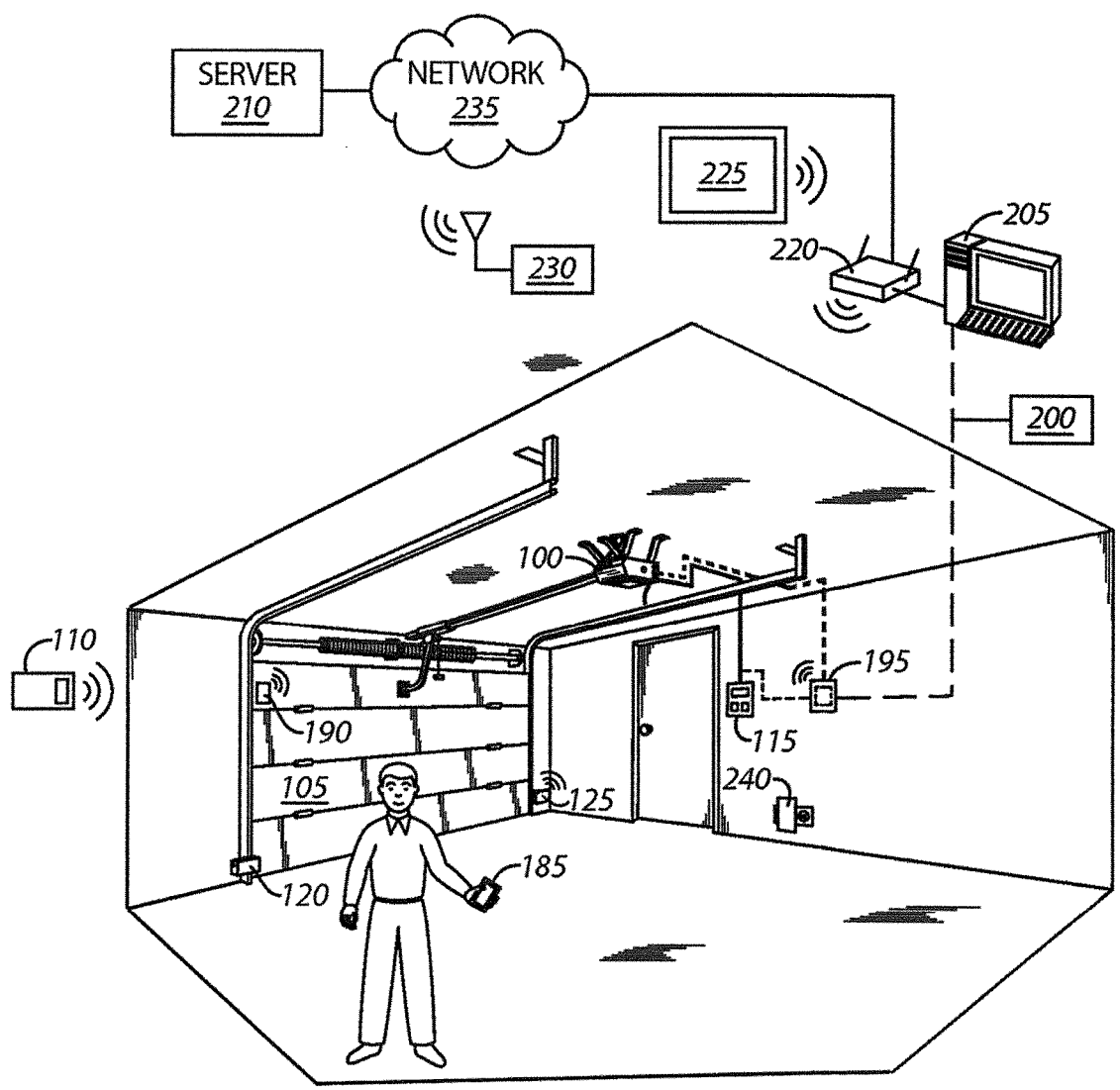
FIG. 3 comprises a perspective view of an example environment in which a wireless obstacle detector and gateway device may be applied as configured in accordance with various embodiments of the invention.
Figure 6:
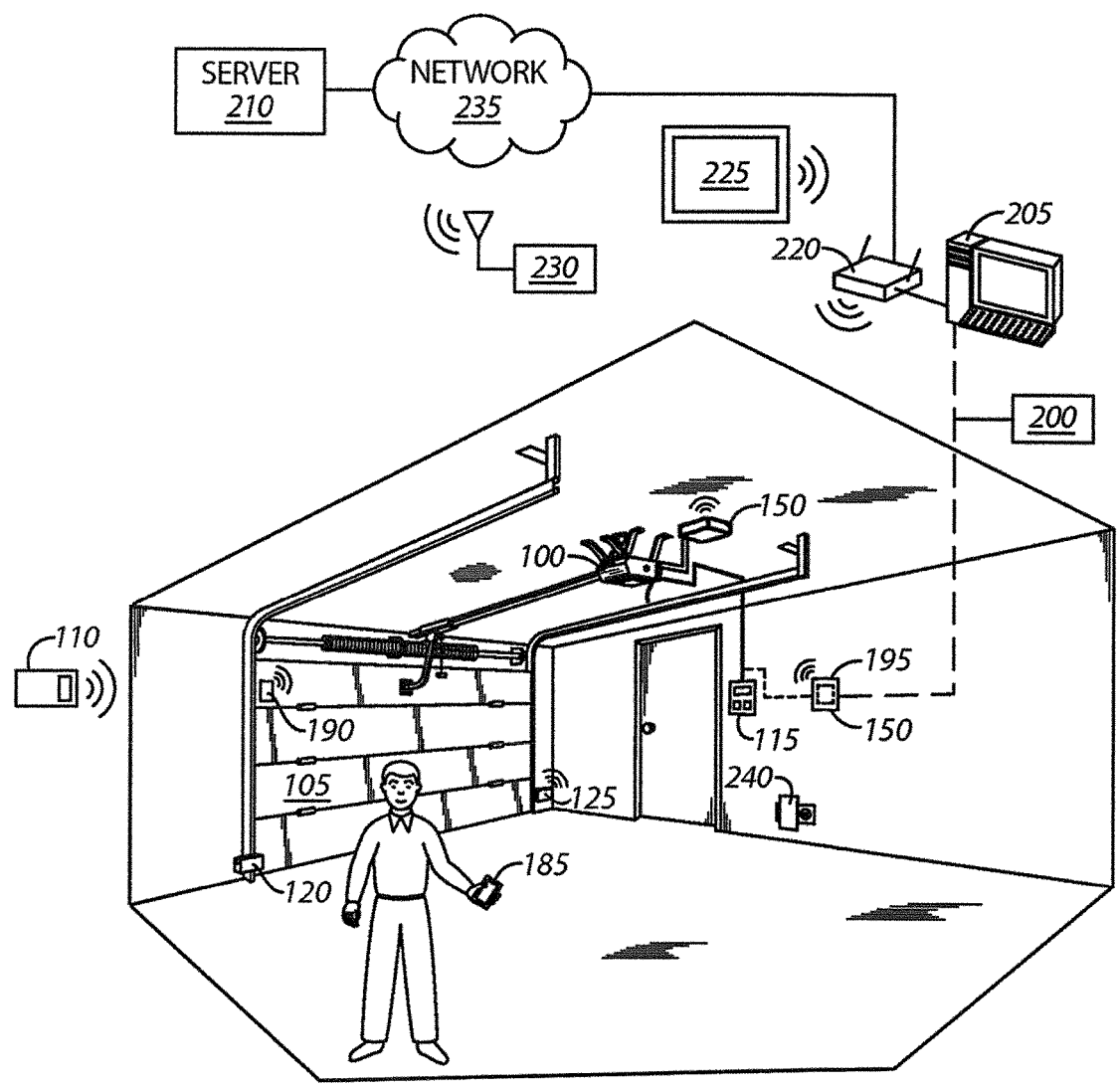
FIG. 6 comprises a perspective view of an example environment in which a wireless obstacle detector, wireless receiver adapter, and a gateway device may be applied as configured in accordance with various embodiments of the invention.

As shown in FIGS. 1, 3, and 6, the communication module (i.e., wireless receiver adapter 150 or gateway device 195) may be configured to communicate with any number of peripheral devices, such as a computing device 200, a home computer 205, a server computing device 210, a mobile computing device 185, a network device 220 configured to enable communications with one or more of a home computer 205, server computing device 210, a mobile computing device 225, or a mobile computing device 230 over a network 235, and combinations thereof. Communications with any of these devices can be made using wired or wireless protocols as are known in the art. Communications with such computing devices can facilitate all manner of network communications such as communications with applications on smart phones and the like or facility monitoring systems as may be available or controlled by networked computing devices. Other than just computing devices, the peripheral device from which the communication module can be configured to receive communications may also include one or more of a network adaptor 240, a separate barrier operator, a hand-held transmitter 110, a wall control 115, a door position sensor 190, to name but a few, and combinations thereof.

Figure 4:
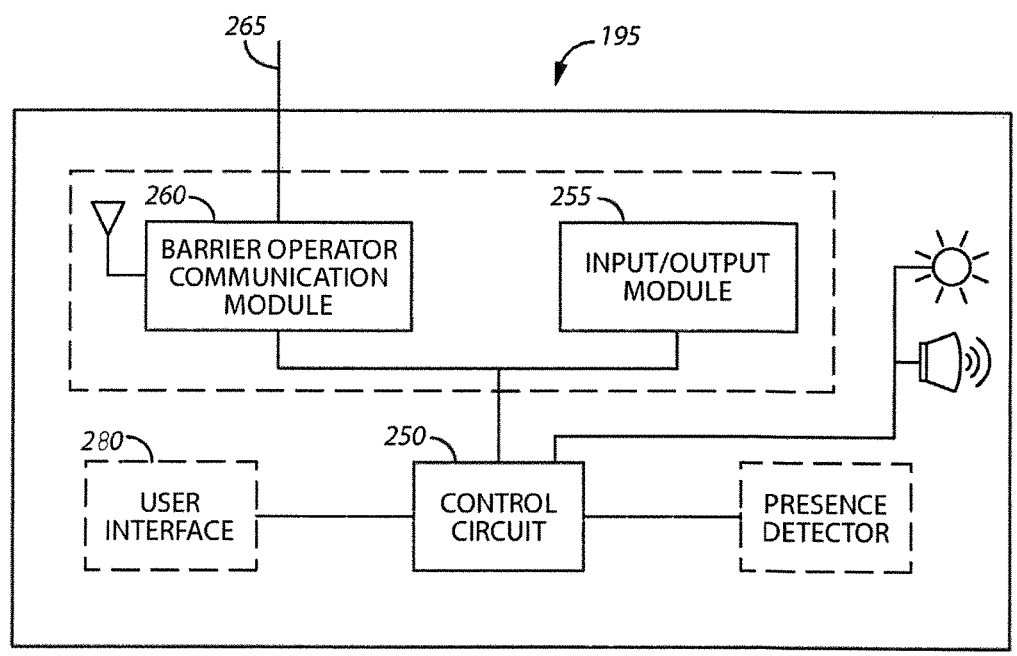
FIG. 4 comprises a block diagram of an example gateway device as configured in accordance with various embodiments of the invention.

In another approach shown in FIGS. 3 and 4, the communication module may take the form of a gateway device 195, such as the barrier operator feature enhancement device disclosed in U.S. Published Patent Application 2014/0125499, which is incorporated by reference in its entirety herein. Such a gateway device 195 allows a user to add functionality to a pre-existing barrier operator 100, such as controlling a barrier operator remotely using a network connected device, such as a smartphone 185. In this embodiment, the photo eyes 120, 125 communicate with the gateway device 195 instead of the wireless receiver adapter 150. The gateway device 195, which is configured to determine which communication protocol a barrier operator uses to receive commands using various methods disclosed in U.S. Published Patent Application 2014/0125499, will under certain conditions override, vary, or omit commands given to the barrier operator dependent on the presence or absence of an obstacle sensed by the photo eyes 120, 125. This allows the gateway device 195 to add obstacle detection features to a pre-installed barrier operator 100 incapable of incorporating such features, such as barrier operators without input ports for photo eyes.

For example, the control circuitry 250 of the gateway device 195 can be configured to not send a signal to effect closing the barrier 105 by the pre-installed barrier operator 100 in response to receiving any one of a variety of signals from the photo eyes 120, 125 that it would be unsafe to close the barrier 105. For example, the control circuitry 250 may be configured not to send a signal to effect closing the barrier 105 in response to receiving a command to do so when detecting that the photo eyes 120, 125 are unable to detect an obstacle. This may occur where the photo eyes 120, 125 are not properly aligned or otherwise rendered incapable of performing its task of detecting an obstacle and thus being unable to warn against operation if an obstacle is present. In another approach, the control circuitry 250 will not send a signal to effect closing the barrier 105 in response to receiving an indication from the input/output module 255 that the photo eyes 120, 125 detected an obstacle. In still another approach, the control circuitry 250 may be configured to send a signal with the barrier operator communication module 260 to effect reversal, i.e., stop closing and effect opening, or alternatively stop closing or effect opening of a barrier 105 by the pre-installed barrier operator 100 in response to detecting that the photo eyes 120, 125 are unable to detect an obstacle or in response to receiving indication from the input/output module 255 that the photo eyes 120, 125 detected an obstacle. Similarly, in response to receiving an indication from a peripheral device that the pre-installed barrier operator 100 is closing a barrier 105 such as from a barrier position sensor 190 or the like, the control circuitry is configured to send a signal to effect reversal, stop closing, or effect opening the barrier 105 by the pre-installed barrier operator 100 in response to detecting that the photo eyes 120, 125 are unable to detect an obstacle or in response to receiving an indication from the input/output module 255 that the photo eyes 120, 125 detected an obstacle. Accordingly, the signals sent to the barrier operator 100 by the gateway device 195 correspond with the signal received from the photo eyes 120, 125, even though the signals sent by the gateway device 195 may be operational commands such as a command to open or stop the barrier 105 instead of signals communicating the presence or absence of an obstacle. So configured, a variety of the advantages to having an obstacle detector can be added to pre-installed barrier operator 100 that is otherwise incapable of using such obstacle detector technology.

In one form, particularly suitable for barrier operators that are not configured to receive commands via a wireless protocol, the gateway device 195 may be configured to send commands to the operator via a wired protocol. In particular, the barrier operator communication module 260 may include a wired communication port 265 for wiring a connection directly to the barrier operator to provide a contact closure technique to close or open the barrier 105. Accordingly, the obstacle detection system including the wireless photo eyes 120, 125 and gateway device 195 advantageously provide obstacle detection, as well as wireless and long range remote operation capabilities to a wide range of barrier operators, including barrier operators that are not configured for obstacle detection, wireless, or long range remote control of the barrier operator.

The gateway device 195 may include a user interface 280 to allow a user to input various commands for controlling the operation of the gateway device 195 as well as obtain the status of or set up the photo eyes 120, 125. For example, the user may configure the control circuit 250 to recognize the presence of the photo eyes 120, 125 and communicate with the photo eyes via the input/output module 255. Alternatively, the control circuit 250 may be configured to automatically detect the presence of the photo eyes 120, 125 by receiving a signal transmitted by the photo eyes 120, 125 at the input/output module 255. In a further aspect, a similar user interface 280 can be provided on another device remote from the gateway device 195. For instance, a mobile device or other computer can be programmed, run an application, or receive signals from another device to effect display of a user interface that allows a user to interact with the gateway device. For example, a smartphone 185 may be configured with an application for allowing a user to obtain the status of the photo eyes 120, 125 or to configure the gateway device to recognize the photo eyes 120, 125.

In accord with the structures described above, and with reference to FIG. 5, a method 300 of providing a wireless communication regarding the presence of an obstacle to a movable barrier operator will be described. The method includes sensing 305 the presence or absence of an obstacle in or near a path of a movable barrier, transmitting 310 wirelessly a signal associated with the presence or absence of an obstacle in or near the path of the movable barrier, and receiving 315 wirelessly by a communication module the signal associated with the presence or absence of an obstacle in or near the path of the movable barrier. In one form, the signal associated with the presence or absence of an obstacle comprises transmitting the signal using a BLUETOOTH wireless protocol. As described above, the control circuitry 165, 250 through a variety of ways is configured for determining 320 the obstacle detector communication protocol used by the separate movable barrier operator configured to move the movable barrier to receive information regarding the presence or absence of an obstacle in or near the path of the movable barrier. The method also includes transmitting 325 from the communication module to the separate movable barrier operator a barrier operator signal using the determined obstacle detector communication protocol, the barrier operator signal corresponding to the received signal associated with the presence or absence of an obstacle in or near the path of the movable barrier. For example, the wireless receiver adapter 150 is configured to transmit a signal using the correct modulation technique understood by the barrier operator to the obstacle detection input port(s) on the barrier operator 100. Alternatively, the gateway device 195 is configured to transmit a signal using the communication protocol understood by the barrier operator, such as an open, reverse, or stop command, when the barrier is closing and the gateway device 195 receives a signal from the obstacle detector signifying the presence of an obstacle near the barrier 105. The method may further include establishing 330 a wireless communications link between an obstacle detector and a communication module remote from the obstacle detector and the movable barrier operator and connecting 335 the communication module to a movable barrier operator with a wireline connection to establish a communication link therebetween.

As discussed above, the step of determining the obstacle detector communication protocol used by the separate movable barrier may include receiving 340 by a communication module a communication indicating at least one of the manufacturer, model, or type of the movable barrier operator from a computing device, such as a mobile device or smartphone 185. Alternatively, the step of determining the obstacle detector communication protocol used by the separate movable barrier operator may include receiving manually 345 the proper protocol, such as by shifting a switch or pressing a button on a communication module to a position corresponding with the determined communication protocol. Alternatively, determining the obstacle detector communication protocol used by the movable barrier operator may include transmitting 350 test barrier operator signals using a plurality of different communication protocols corresponding to a plurality of different movable barrier operator types until the obstacle detector communication protocol is selected. In some forms, determining the communication protocol used by the movable barrier operator involves selecting 355 a modulation technique used by the separate movable barrier operator to detect the presence or absence of an obstacle in or near the path of the movable barrier.

Figure 5:
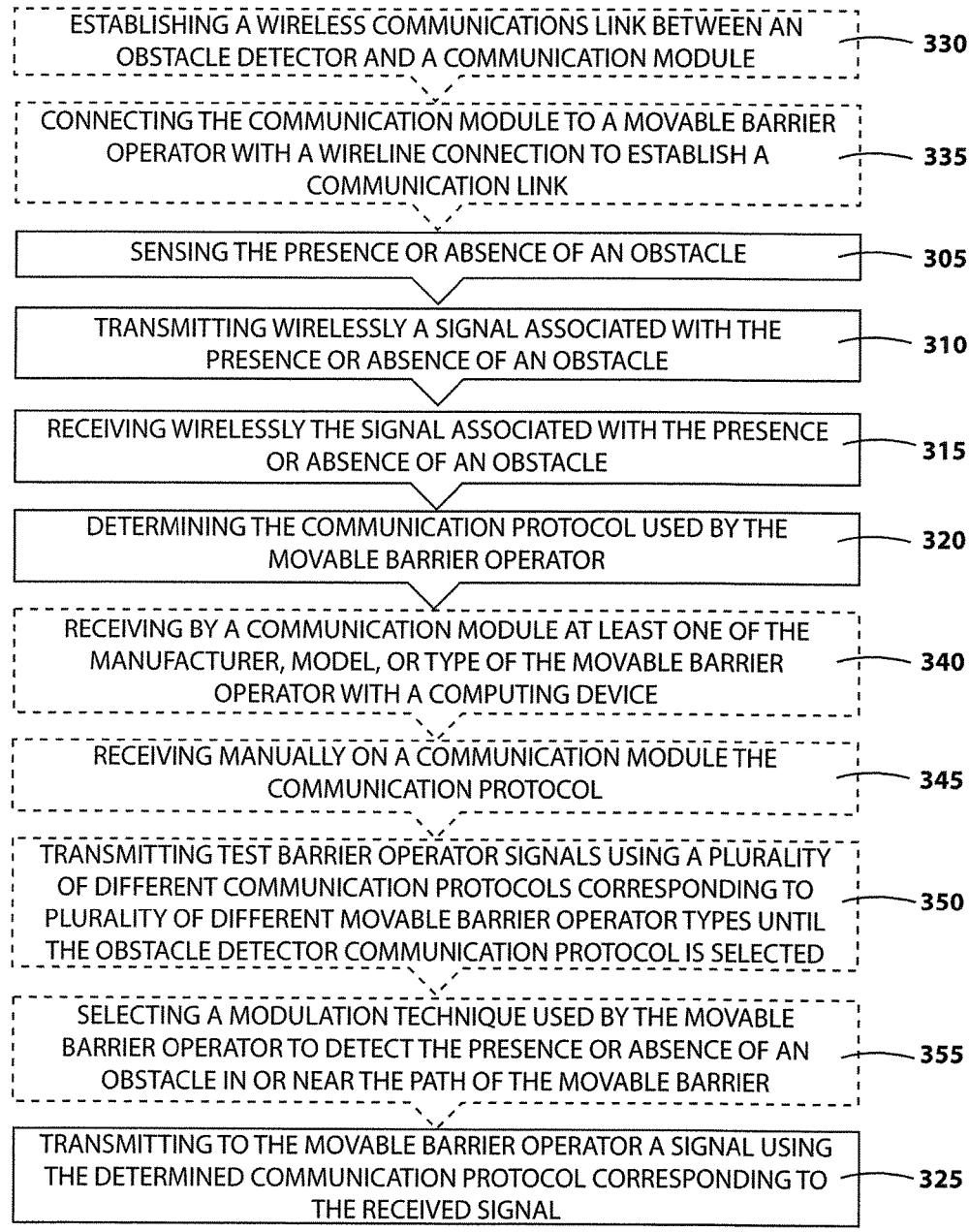
FIG. 5 comprises a flow diagram of an example method of operation for a wireless obstacle detection system as configured in accordance with various embodiments of the invention.

In an additional embodiment, the functionality or logic described with respect to FIG. 5 and elsewhere in this disclosure may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). Any of these structures are known to those of skill in the art and needs no further description.

The wireless photo eyes 120, 125 described in this application may be packaged together with one or more of the wireless receiver adapter 150, a gateway device 195, and any of a variety of the peripheral devices described above to facilitate provision of additional features to pre-installed barrier operators. For example, the wireless photo eyes 120, 125 may be sold together with a tilt sensor for mounting on the door, a remote control device, a network adapter, and the like. Such a kit can then be purchased by a user and installed as described above to provide enhanced operability to the barrier operator previously installed at the user's premises.

In another example, FIG. 6 illustrates another potential arrangement of the obstacle detection system. In this approach, the wireless receiver adapter 150 and the gateway device 195 are installed as in FIGS. 1 and 3. In this embodiment, the wireless photo eyes 120, 125 communicate with the wireless receiver adapter 150. However, the gateway device 195 is configured to communicate with the wireless receiver adapter 150 or directly with the wireless photo eyes 120, 125 to receive information about the status and settings of the photo eyes 120, 125. In addition, the gateway device 195 may be used to configure the processing device or control circuit 165 of the wireless receiver adapter 150 to use the appropriate communication protocol, i.e. the modulation technique used by the barrier operator 100 for obstacle detection. For example, the control circuit 250 of the gateway device 195 may be configured to communicate via a BLUETOOTH protocol or other protocol, such as a 315 MHz signal, with the input/output module 170 of the wireless receiver adapter 150 to communicate the model of the barrier operator, or alternatively the modulation technique used by the operator 100 for obstacle detection. In this form, the gateway device 195 allows for automatic configuration of the wireless receiver adapter 150 for communication with the barrier operator 100. In this form, the obstacle detection system advantageously uses the barrier operator's internal safety functions, i.e., the barrier operator 100 will function just as if it were using wired photo eyes designed for use with the particular barrier operator. However, the user obtains the additional benefit of the functionality added by the gateway device 195, such as long range remote operation.

In addition, the gateway device 195 can monitor the photo eyes 120, 125 to ensure that they are functioning properly and gateway device 195 can control the barrier operator 100 accordingly. The gateway device 195 can also monitor the actions of the preinstalled operator 100 via the sensor 190 to ensure that the operator is performing the intended function. If the barrier 105 is in motion in the downward direction and the gateway device 195 detects a failure of the photo eyes 120, 125, the gateway device can force the operator 100 to reverse direction by giving one or more commands via the barrier operator communication module 260 to perform the desired function. Accordingly, this embodiment may provide an additional layer of safety in the case of a malfunction of the obstacle detection system.

Those skilled in the art will recognize that a wide variety of modifications, alterations, and combinations can be made with respect to the above described embodiments without departing from the scope of the invention. For example, although the obstacle detection system is described largely in the context of a garage in use with a garage door opener, such a feature enhancement device can be applied in other barrier operator contexts, such as gate operators and the like. Moreover, any of the features described herein can be incorporated into a movable barrier operator. Such modifications, alterations, and combinations are to be viewed as being within the ambit of the inventive concept.

What is claimed is:

1. A wireless obstacle detector and communication module combination comprising:
   an obstacle detector configured to detect an obstacle in or near a path of a movable barrier, the obstacle detector comprising a wireless transmitter configured to wirelessly send communications regarding presence or absence of an obstacle in or near the path; and
   a communication module configured to receive the communications from the wireless transmitter of the obstacle detector and to communicate with a plurality of different movable barrier operator types having at least two different protocols for receiving obstacle detector information, the communication module comprising:
   a wireless module configured to wirelessly receive the communications from the wireless transmitter of the obstacle detector;
   a barrier operator communication module configured to transmit communications to a separate movable barrier operator having one of the plurality of different movable barrier operator types and configured to move the movable barrier;
   a processing device in operative communication with the wireless module and the barrier operator communication module, the processing device configured to effect transmission of a barrier operator communication to the separate movable barrier operator conveying information regarding the presence or absence of the obstacle in or near the path using one of the at least two different protocols for receiving obstacle detector information based on the communication received from the obstacle detector.

2. The wireless obstacle detector and communication module combination of claim 1, wherein the processing device is further configured to determine the one of the at least two different protocols used by the separate movable barrier operator for obstacle detection.

3. The wireless obstacle detector and communication module combination of claim 2, wherein the processing device is configured to determine the one of the at least two different protocols by receiving a communication from a computing device indicating any combination of a group consisting of: a manufacturer, model and type of the movable barrier operator.

4. The wireless obstacle detector and communication module combination of claim 2, wherein the communication module further comprises a user interface and the processing device is configured to determine the one of the at least two different protocols based on an input received at the user interface.

5. The wireless obstacle detector and communication module combination of claim 2, wherein the processing device is configured to determine the one of the at least two different protocols by effecting transmission of the barrier operator communication using the at least two different protocols in sequence until the processing device receives an indication that the protocol last used by the communication module is the protocol used by the separate movable barrier operator.

6. The wireless obstacle detector and communication module combination of claim 1, wherein the processing device is further configured to communicate wirelessly with a peripheral device via the wireless module.

7. The wireless obstacle detector and communication module combination of claim 6, wherein the peripheral device is a computing device.

8. The wireless obstacle detector and communication module combination of claim 6, wherein the processing device is configured to communicate wirelessly with the peripheral device to at least one of:
   provide a status of the obstacle detector to the peripheral device;
   establish a communication link between the obstacle detector and the communication module; and
   determine the one of the at least two different protocols used by the separate movable barrier operator.

9. The wireless obstacle detector and communication module combination of claim 1, wherein the communication module is a gateway device configured to cause an operation of the separate movable barrier operator in response to a command from a computing device over a network.

10. The wireless obstacle detector and communication module combination of claim 1, wherein the processing device is configured to transmit a communication regarding an operational status of the obstacle detector to a gateway device configured to cause an operation of the separate movable barrier operator in response to a command from a device over a network.

11. The wireless obstacle detector and communication module combination of claim 1, wherein the barrier operator communication module of the communication module is configured to transmit the barrier operator communication via a wireline connection to the separate movable barrier operator to communicate at least the presence or absence of an obstacle in the path as detected by the obstacle detector.

12. An apparatus for detecting an obstacle at or near a movable barrier, the apparatus comprising:
   an optical-based obstacle detector configured to detect presence or absence of an obstacle between two elements thereof, the obstacle detector comprising a wireless transmitter configured to transmit a signal corresponding to the presence or absence of an obstacle as detected by the obstacle detector;
   a communication module including a wireless receiver configured to receive the signal from the wireless transmitter of the obstacle detector and a barrier operator communication module configured to communicate with a plurality of different movable barrier operator types having at least two different protocols for receiving obstacle detector information; and a processing device of the communication module operatively connected to the wireless receiver and the barrier operator communication module, the processing device configured to translate the received signal from the wireless transmitter of the obstacle detector into one of the at least two different protocols to effect sending by the barrier operator communication module a barrier operator signal, the barrier operator signal having one of the at least two different protocols for obstacle detector information and operable to stop or reverse closure of the movable barrier by a separate movable barrier operator configured to move the movable barrier when an obstacle is detected by the obstacle detector.

13. The apparatus of claim 12, wherein the barrier operator communication module is configured to transmit the barrier operator signal via a wireline connection to the separate movable barrier operator to communicate at least the presence or absence of an obstacle sensed by the obstacle detector to the separate movable barrier operator.

14. The system of claim 12, wherein the at least two different protocols are a plurality of different modulation techniques used by different ones of the plurality of different movable barrier operator types respectively for detecting the presence or absence of the obstacle.

15. The system of claim 12, wherein the at least two different protocols correspond to a plurality of different commands understood by the plurality of different movable barrier operator types including at least one of a group consisting of a stop, open, and reverse closure command.

16. The system of claim 12, wherein the processing device is configured to receive a selection from a user to select the one of the at least two different protocols that is understandable by the separate movable barrier operator.

* * * * *